United States Patent [19]

Yu et al.

[11] Patent Number: 4,970,261
[45] Date of Patent: Nov. 13, 1990

[54] FIBER-REINFORCED POLY(BIPHENYLENE SULFIDE) COMPOSITES AND METHODS

[75] Inventors: Michael C. Yu; Merlin R. Lindstrom; Alex Y. C. Lou, all of Bartlesville, Okla.

[73] Assignee: Phillips Petroleum Company, Bartlesville, Okla.

[21] Appl. No.: 413,981

[22] Filed: Sep. 28, 1989

[51] Int. Cl.$^5$ .................. B32B 27/04; C08K 3/40; C08K 3/04

[52] U.S. Cl. .................. 524/609; 523/222; 525/420; 428/419; 156/180; 156/181; 264/136; 427/374.4; 427/389.8; 427/393.5; 427/434.6

[58] Field of Search .................. 528/388; 523/222; 524/609; 525/420; 428/419; 156/180, 181; 264/136; 427/374.4, 389.8, 393.5, 434.1

[56] References Cited

U.S. PATENT DOCUMENTS

| | | | |
|---|---|---|---|
| 3,354,129 | 11/1967 | Edmonds, Jr. et al. | 260/79 |
| 3,819,407 | 6/1974 | Oates et al. | 117/138.8 |
| 4,292,105 | 9/1981 | Taylor | 156/242 |
| 4,356,228 | 10/1982 | Kobayashi et al. | 428/283 |
| 4,522,875 | 6/1985 | Still, Jr. et al. | 428/285 |
| 4,544,701 | 10/1985 | Walker et al. | 524/609 |
| 4,559,262 | 12/1985 | Cogswell et al. | 428/294 |
| 4,654,410 | 3/1987 | Kashiwame et al. | 528/388 |
| 4,680,224 | 7/1987 | O'Connor | 428/294 |
| 4,837,294 | 6/1989 | Ichikawa et al. | 528/388 |

FOREIGN PATENT DOCUMENTS 231030  9/1986  Japan .................. 528/388

Primary Examiner—Lewis T. Jacobs
Assistant Examiner—David W. Woodward
Attorney, Agent, or Firm—Laney, Dougherty, Hessin & Beavers

[57] ABSTRACT

Composites comprised of reinforcing fibers in a continuous matrix of poly(biphenylene sulfide) resin and methods of producing such composites are provided. The poly(biphenylene sulfide) resin is produced by reacting 4,4'-difluorobiphenyl with an alkali metal sulfide in a polar organic compound whereby the resin has a high melting point and a high melt viscosity, and the composites formed therefrom have excellent mechanical properties and retention of mechanical properties at high temperatures.

18 Claims, No Drawings

FIBER-REINFORCED POLY(BIPHENYLENE SULFIDE) COMPOSITES AND METHODS

BACKGROUND OF THE INVENTION

1. Field Of The Invention

The present invention relates to fiber-reinforced poly(biphenylene sulfide) composites having improved mechanical properties and methods of producing such composites.

2. Description of the Prior Art.

Reinforced poly(arylene sulfide) composites are highly suitable for forming a variety of parts and objects. Because of their outstanding chemical, heat and electrical insulation resistance as well as their superior rigidity when compared to other thermoplastics, poly(arylene sulfide) resins have found favor for forming reinforced plastic composites.

A particularly suitable poly(arylene sulfide) resin for forming fiber-reinforced composites, both by injection molding and pultrusion techniques, has been found to be poly(phenylene sulfide) resin. Fiber-reinforced poly(phenylene sulfide) composites exhibit excellent mechanical properties and are utilized in a great variety of products. However, in product applications where very high temperature exposure is required, e.g., temperatures in the range of from about 400° F. to about 600° F., poly(phenylene sulfide) composites generally do not maintain high rigidity and strength.

A poly(arylene sulfide) resin which has heretofore been found to have a very high melting point and to be suitable for use at very high temperatures is poly(biphenylene sulfide) resin. Poly(biphenylene sulfide) resin retains its hardness at temperatures as high as about 700° F. whereas poly(phenylene sulfide) resin loses hardness at temperatures in the range of from 300° F. to 400° F. Composites comprised of reinforcing fibers in a continuous matrix of poly(biphenylene sulfide) resin, in addition to having high melting points, also generally have high retention of mechanical properties at elevated temperatures. For example, such composites generally maintain full rigidity and strength (compared to their rigidity and strength at room temperature) up to about 400° F. At 600° F. the composites generally retain about 80% and 35% of their room temperature flexural modulus and flexural strength, respectively.

Heretofore, poly(biphenylene sulfide) resin has been prepared from sodium sulfide and either 4,4'-dichlorobiphenyl or 4,4'-dibromobiphenyl. The resin prepared from 4,4'-dichlorobiphenyl is superior to that which is prepared from 4,4'-dibromobiphenyl. However, the use of polychlorinated biphenyl has been discontinued as a result of its having been found to be hazardous to human health.

By the present invention improved composites comprised of reinforcing fibers in a continuous matrix of poly(biphenylene sulfide) resin and methods of preparing such composites are provided. The resin utilized in accordance with the present invention has a higher melting point and a higher melt viscosity as compared to poly(biphenylene sulfide) resin formed from sodium sulfide and 4,4'-dibromobiphenyl. As a result, the composites of the invention have better mechanical properties at room temperature and better retention of mechanical properties at elevated temperatures.

SUMMARY OF THE INVENTION

Composites comprised of reinforcing fibers in a continuous matrix of poly(biphenylene sulfide) resin and methods of producing such composites are provided. The poly(biphenylene sulfide) resin is produced by reacting 4,4'-difluorobiphenyl with an alkali metal sulfide in a polar organic solvent whereby the resin has a high melting point and a high melt viscosity, and the composites formed therefrom have excellent mechanical properties and excellent retention of mechanical properties at high temperatures. In a preferred embodiment, the alkali metal sulfide is sodium sulfide, the polar organic compound is N-methyl-2-pyrrolidone and the polymerization reaction is carried out at an elevated temperature in the range of from about 260° F. to about 840° F.

The method for producing the improved poly(biphenylene sulfide)-fiber composite of the present invention comprises impregnating reinforcing fibers with poly(biphenylene sulfide) resin produced from 4,4'-difluorobiphenyl as described above, heating the resin-impregnated reinforcing fibers to a temperature sufficient to melt the resin and to consolidate the resin and reinforcing fibers and then cooling the resin and reinforcing fibers to solidify the resin. Two or more of the composites produced as described above can be heated and pressed to form a multi-ply laminated composite.

It is, therefore, a general object of the present invention to provide improved fiber-reinforced poly(biphenylene sulfide) composites and methods of producing such composites.

A further object of the present invention is the provision of composites comprised of reinforcing fibers in a continuous matrix of poly(biphenylene sulfide) resin which have excellent mechanical properties and retention of mechanical properties at high temperatures.

Other objects, features and advantages of the present invention will be readily apparent to those skilled in the art upon a reading of the description of preferred embodiments which follows.

DESCRIPTION OF PREFERRED EMBODIMENTS

The composites of the present invention are comprised of reinforcing fibers in a continuous matrix of poly(biphenylene sulfide) resin. The poly(biphenylene sulfide) resin is produced by reacting 4,4'-difluorobiphenyl with an alkali metal sulfide in a polar organic compound at an elevated temperature and for a sufficient time whereby the resulting resin has a high melting point and a high melt viscosity.

A process of preparing polymers from aromatic compounds which is particularly suitable for preparing the poly(biphenylene sulfide) resin useful in accordance with this invention is described in U.S. Pat. No. 3,354,129 issued Nov. 21, 1967 which is incorporated herein by reference. The process generally comprises the steps of reacting at least one polyhalo-substituted aromatic compound wherein the halogen atoms are attached to ring carbon atoms with an alkali metal sulfide in a polar organic compound at an elevated temperature for a sufficient time. The polar organic compound is a compound that will substantially dissolve both the alkali metal sulfide and the polyhalo-substituted aromatic compound. In Example XVIII of the patent, a preparation of poly(biphenylene sulfide) resin is described wherein 4,4'-dibromobiphenyl was reacted with sodium sulfide in N-methyl-2-pyrrolidone solvent. Hydrated sodium sulfide was dissolved in the N-methyl-2-pyrrolidone. The resulting solution was dehydrated by overhead distillation after which the 4,4'-dibromobiphenyl was added. The solution was reacted at 572° F., and the resulting polymer was washed three times with water, and air dried.

In accordance with the present invention, the poly(biphenylene sulfide) resin is produced utilizing the process of U.S. Pat. No. 3,354,129 or the equivalent except that the alkali metal sulfide is reacted with 4,4'-difluorobiphenyl in a polar organic solvent. The alkali metal sulfide is preferably sodium sulfide, and while hydrated sodium sulfide can be utilized, it is more preferable to form the sodium sulfide in situ by dissolving sodium hydrosulfide and sodium hydroxide in the polar solvent. The resulting solution is heated and the lesser amount of water formed is removed by distillation. The preferred polar organic compound is N-methyl-2-pyrrolidone, and the reaction is carried out at a temperature in the range of from about 260° F. to about 840° F., preferably from about 480° F. to about 570° F. for a time period of about three hours. Most preferably, the reactants are maintained at a temperature of about 480° F. for about one hour, followed by increasing the temperature to about 540° F. and maintaining it for an additional two hours. After cooling, the crude polymer product is preferably washed and filtered and then air dried.

The fibrous reinforcing material included in the composites of this invention can be selected from carbon fibers, glass fibers and aramid fibers, with carbon fibers being the most preferred. The fibers can be present in the poly(biphenylene sulfide) resin in the form of one or more individual strands or rovings of fibers. The individual fibers in a strand will typically have a diameter in the range of from about 4 to about 10 microns and the strands or rovings can contain anywhere from about 1,000 to about 12,000 fibers.

In producing the improved poly(biphenylene sulfide)fiber composites of this invention, an aqueous slurry of the poly(biphenylene sulfide) resin produced as described above can be utilized for slurry impregnation of the reinforcing fibers. Generally, the particles in the slurry should have an average particle size of from about 2 microns to about 50 microns. The slurry is agitated and surfactant is added if required in order to provide a uniform dispersion. A strand or roving of reinforcing fibers is pulled through the slurry in a known manner whereby the fibers are impregnated with the resin in an amount in the range of from about 20% to about 80% by weight of the resulting fibers-resin mixture. The fibers are then at least partially dried and pulled through a hot forming die. The temperature of the forming die is sufficiently high for the resin to reach the molten state and form a matrix. The heated die has a cross-sectional dimension such that as the impregnated fiber-reinforcing material is pulled therethrough, the thermoplastic resin and fibers are consolidated into a composite. The resulting composite contains continuous unidirectionally aligned fibers, and depending upon the shape of the heated forming die can be produced in the form of a bar, tape or sheet containing in the range of from about 20% to about 80% poly(biphenylene sulfide) resin by weight of the composite. The continuously pultruded composite can be pulled through a cutting apparatus whereby it is cut into articles of desired length.

Multi-ply laminated composites can be formed from the single-ply composites by heating and pressing at least two of the single-ply composites in a heated pressure mold. Generally, the poly(biphenylene sulfide) resin-impregnated reinforcing fibers are heated in the heated forming die to a temperature in the range of from about 840° F. to about 905° F. whereby the resin is melted and the resin and reinforcing fibers are consolidated. When multi-ply laminated composites are formed using a heated press mold, the mold is generally heated to a temperature in the same range, i.e., a temperature in the range of from about 840° F. to about 905° F.

As will be understood by those skilled in the art, the reinforcing fibers can be in forms other than strands or rovings, as for example in woven mats, and techniques other than pultrusion can be used for impregnating the fibers with resin and consolidating the resin and fibers into composites whereby the fibers are contained in a resin matrix.

In order to further illustrate the improved poly(biphenylene sulfide)-fiber composites and methods of producing such composites of the present invention, the following examples are given.

EXAMPLE 1

Poly(biphenylene sulfide) resin was prepared from 4,4'-difluorobiphenyl, N-methyl-2-pyrrolidone, sodium hydrosulfide and sodium hydroxide. In a typical 4-mole scale run, a 2-gallon stainless steel autoclave manufactured by Autoclave Engineers, Inc. equipped with a stirrer having a stirring speed of about 300 rpm was charged with 4 moles (380.2 grams) of sodium hydrosulfide solution (59.0% by weight), 4.12 moles (164.8 grams) of sodium hydroxide, 4 moles (760.8 grams) of 4,4'-difluorobiphenyl and 28.0 moles (2,376 milliliters) of N-methyl-2-pyrrolidone. The temperature was raised to 482° F. and held for one hour. The temperature was then raised to 572° F. and held for 2 hours. The pressure of the reactor reached about 360 psig at the end of the heating time period. The heating was discontinued and the autoclave and its contents were cooled overnight. The crude polymer product was washed and filtered 6 times with hot deionized water and dried in a forced air oven at 266° F. for one day or until constant weight. The typical yield was 739 grams.

For comparison purposes, poly(biphenylene sulfide) was prepared in the same manner except that 4,4'-dibromobiphenyl was utilized instead of 4,4'-difluorobiphenyl. In order to compare the thermal properties of the two resins, the melt temperatures of the resins were determined by pressing a quantity of each resin on a hot bar with a spatula. The temperature of the hot bar was varied until the resin melted in 10 seconds. The melting point and heat of fusion of the resins were also determined by differential scanning calorimetry. The results of these tests are given in Table I below.

TABLE I

| | Thermal Properties | |
| --- | --- | --- |
| | Poly(biphenylene Sulfide) Resin Made From Difluorobiphenyl | Poly(biphenylene Sulfide) Resin Made From Dibromobiphenyl |
| Resin Melt Temperature[1], °F. | 824 | 788 |
| Resin Melt Temperature[2], °F. | 833 | 815 |

TABLE I-continued

| | Thermal Properties | |
|---|---|---|
| | Poly(biphenylene Sulfide) Resin Made From Difluorobiphenyl | Poly(biphenylene Sulfide) Resin Made From Dibromobiphenyl |
| Heat of Fusion[2], cal./g. | 16.73 | 14.3 |

[1]Resin was pressed on a hot bar at different temperatures with a spatula until the resin melted in 10 sec.
[2]Determined by differential scanning calorimetry.

As indicated in Table I, the poly(biphenylene sulfide) resin made from 4,4'-difluorobiphenyl has a higher melting temperature than the resin made from 4,4'-dibromobiphenyl. The poly(biphenylene sulfide) resin produced from 4,4'-difluorobiphenyl was also more viscous on melting as compared to the resin made from 4,4'-dibromobiphenyl.

EXAMPLE 2

The pultrusion process and apparatus described in U.S. Pat. No. 4,680,224 issued July 14, 1987 to O'Connor was utilized for producing "prepreg" tape composite of carbon fiber and poly(biphenylene sulfide) resin made from 4,4'-difluorobiphenyl. The carbon fiber used was manufactured by Hercules, Inc. of Wilmington, Del. under the trade designation AS4. The particle size of the poly(biphenylene sulfide) resin was reduced to an average of about 11 microns prior to preparing a slurry thereof. Table II below shows the prepregging conditions for the poly(biphenylene sulfide)-carbon fiber composite, and for comparison purposes, the typical prepregging conditions for equivalent poly(phenylene sulfide) resin-carbon fiber composite.

TABLE II

| | Prepregging Conditions | |
|---|---|---|
| | Poly(biphenylene Sulfide) Made With 4,4'-difluoro-biphenyl | Poly(phenylene Sulfide) |
| Line Speed, in/min | 25 | >36 |
| Die Temperature | 825–870° F. | 600° F. |
| Drying Chamber Temperature | 1004° F. | 950° F. |
| Slurry Concentration, wt % | 6 | 15 |
| Average Particle Size, | 11 | 10–15 |
| Resin Content, wt. % of composite formed | 40 | 40 |
| Fiber Content, wt. % of composite formed | 60 | 60 |
| Prepreg Width, 3" die | 2.0–2.5" | 3" |
| Thickness, mils | 10–15 | 8 |

EXAMPLE 3

To assess the differences between poly(biphenylene sulfide) resins made from 4,4'-difluorobiphenyl and 4,4'-dibromobiphenyl, composites were made using plain weave carbon fiber mats. Slurries of the poly(biphenylene sulfide) resins were made by mixing 50-gram portions of the resins with 125 grams of water in a Waring blender. The slurries obtained were applied using a 1-inch paint brush on both sides of plain weave carbon fiber mats having sizes of about 2.5 inches by 6 inches. The carbon fiber mats were obtained from Hexcel Corporation. The resin-loaded fiber mats were dried in an oven at 292° F. for at least one hour. Four dried resin-fiber mats of the same resin were stacked, sandwiched between aluminum sheets and iron plates and subjected to 850° F. heat in a Pasadena press for 5 minutes with contact pressure. The fiber mats and iron plates were then transferred to an ambient temperature press and consolidated at 2 tons of pressure held for 3 minutes. Four of the 4-ply composite sheets obtained having thicknesses in the range of from about 30 to about 37 mils were then trimmed to fit into a 2.5 inch by 6 inch by 0.25 inch picture frame mold. The picture frame mold and composite sheets were sandwiched between 2 aluminum foils and iron plates and subjected to a temperature of about 850° F. to 860° F. in a Pasadena press with contact pressure for 10 minutes. The plates were then carefully transferred to an ambient temperature press and consolidated under 2 tons of pressure. The resulting 2.5 inch by 6 inch to 0.125 inch multi-ply composite was evaluated for mechanical properties in accordance with standard ASTM test procedures. For comparison purposes, a multi-ply composite using poly(phenylene sulfide/ketone) resin was made in exactly the same manner as described above and also tested. The results of the tests for the 3 composites are set forth in Table III below.

TABLE III

| Mechanical Properties of Carbon Fiber Composites | | | | |
|---|---|---|---|---|
| Temperature (°F.) | Flexural Modulus[2] (MSI) | Flexural Strength[2] (KSI) | Maximum Deflection[2] (inch) | Fiber Strain[2] (%) |
| Poly(biphenylene Sulfide) Resin Made From 4,4'-Difluorobiphenyl | | | | |
| 75 | 4.68 | 20.1 | .0325 | .006 |
| 550 | 4.71 | 25.3 | .039 | .007 |
| % retention[1] at 550° F. | 101 | 126 | | |
| Poly(biphenylene Sulfide) Resin Made From 4,4'Dibromobiphenyl | | | | |
| 75 | 3.95 | 16.5 | .04 | .007 |
| 550 | 2.21 | 13.2 | .07 | .012 |
| % retention[1] at 550° F. | 56 | 80 | | |
| Poly(phenylene Sulfide/Ketone) Resin | | | | |
| 75 | 2.66 | 41.2 | .1455 | .028 |
| 250 | 2.88 | 38.3 | .1195 | .023 |
| 350 | 1.53 | 19.8 | .35 | .066 |
| 550 | .71 | 8.74 | .441 | .083 |
| % retention[1] at 350° F. | 57 | 48 | | |
| % retention[1] at 550° F. | 27 | 21 | | |

[1]The properties were compared to properties at ambient temperature (75° F.).
[2]Determined in accordance with ASTM D790.

From Table III it can be seen that the poly(biphenylene sulfide) resin made from 4,4'-difluorobiphenyl had the best mechanical properties and the best retention of mechanical properties at 550° F. as compared to the same properties at ambient temperature.

EXAMPLE 4

Additional composites were prepared using poly(biphenylene sulfide) made from 4,4'-difluorobiphenyl as described in Example 3. The mechanical properties of the composites were tested at various temperatures in accordance with ASTM test procedures. The results of these tests are given in Table IV.

TABLE IV

Mechanical Properties of Composites of
Fiber and Poly(biphenylene Sulfide) Resin
Made From 4,4'-Difluorobiphenyl at Various Temperatures
Longitudinal Flexural Properties[1]

| | Flexural | Flexural | Maximum | Fiber |

TABLE IV-continued
Mechanical Properties of Composites of
Fiber and Poly(biphenylene Sulfide) Resin
Made From 4,4'-Difluorobiphenyl at Various Temperatures
Longitudinal Flexural Properties[1]

| Temperature (°F.) | Modulus (MSI) | Strength (KSI) | Deflection (inch) | Strain (%) |
|---|---|---|---|---|
| 75 | 13.80 | 94.75 | .147 | .007 |
| 200 | 14.24 | 97.31 | .145 | .007 |
| 300 | 13.44 | 96.24 | .155 | .007 |
| 400 | 13.00 | 90.02 | .138 | .007 |
| 500 | 12.33 | 53.54 | .093 | .004 |
| 600 | 10.91 | 33.66 | .066 | .003 |

| Temperature (°F.) | Retention, % | | | |
|---|---|---|---|---|
| 200 | 103.2 | 102.7 | 98.6 | 100.0 |
| 300 | 97.4 | 101.6 | 105.4 | 100.0 |
| 400 | 94.2 | 95.0 | 93.9 | 100.0 |
| 500 | 89.3 | 56.4 | 63.3 | 57.1 |
| 600 | 79.1 | 35.5 | 44.9 | 42.9 |

[1]Determined in accordance with ASTM D790.

From Table IV it can be seen that the poly(biphenylene sulfide) resin-carbon fiber composites suffered no loss in mechanical properties until 400° F. where only a relatively small loss in flexural modulus and strength occurred. At temperatures above 400° F., more pronounced losses in mechanical properties were observed. However, even at 600° F. the composite still maintained 79% and 35% flexural modulus and strength, respectively.

Thus, the present invention is well adapted to carry out the objects and attain the ends and advantages mentioned as well as those inherent therein. While numerous changes to the composites and methods of the invention may be made by those skilled in the art, such changes are encompassed within the spirit of this invention as defined by the appended claims.

What is claimed is:

1. A composite comprised of reinforcing fibers in a continuous matrix of poly(biphenylene sulfide) resin, said poly(biphenylene sulfide) resin being produced by a process comprised of reacting difluorobiphenyl with an alkali metal sulfide in a polar organic compound at a temperature in the range of from about 260° F. to about 820° F. for a time sufficient to obtain a polymer resin consisting essentially of repeat units of the formula:

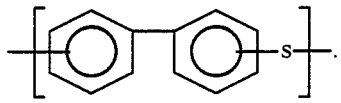

2. The composite of claim 1 wherein said reinforcing fibers are selected from the group consisting of carbon fibers, glass fibers and aramid fibers.

3. The composite of claim 2 wherein said poly(biphenylene sulfide) resin comprises in the range of from about 20% to about 80% by weight of said composite.

4. The composite of claim 1 wherein said alkali metal sulfide is sodium sulfide.

5. The composite of claim 4 wherein said sodium sulfide is formed in situ by charging sodium hydrosulfide and sodium hydroxide to said reaction.

6. The composite of claim 5 wherein said polar organic compound is N-methyl-2-pyrrolidone.

7. The composite of claim 6 wherein said reinforcing fibers are carbon fibers.

8. The composite of claim 7 wherein said poly(biphenylene sulfide) resin comprises in the range of from about 20% to about 80% by weight of said composite.

9. A method of producing a thermoplastic-fiber composite comprising:
(a) impregnating reinforcing fibers with a poly(biphenylene sulfide) resin, said poly(biphenylene sulfide) resin being produced by a process comprises of reacting difluorobiphenyl with an alkali metal sulfide in a polar organic compound at a temperature in the range of from about 260° F. to about 840° F. for a time sufficient to obtain a polymer resin consisting essentially of repeat units of the formula:

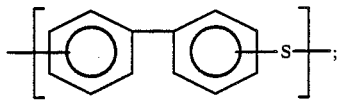

(b) heating said resin impregnated reinforcing fibers of step (a) to a temperature sufficient to melt said resin and to consolidate said resin and reinforcing fibers; and
(c) cooling said resin and reinforcing fibers to solidify the resin.

10. The method of claim 9 wherein said reinforcing fibers are selected from the group consisting of carbon fibers, glass fibers and aramid fibers.

11. The method of claim 10 wherein said reinforcing fibers are impregnated with said poly(biphenylene sulfide) resin in an amount in the range of from about 20% to about 80% by weight of the resulting impregnated reinforcing fibers.

12. The method of claim 9 wherein said alkali metal sulfide is sodium sulfide.

13. The method of claim 12 wherein said sodium sulfide is formed in situ by charging sodium hydrosulfide and sodium hydroxide to the reaction mixture.

14. The method of claim 13 wherein said polar organic compound is N-methyl-2-pyrrolidone.

15. The method of claim 14 wherein said reinforcing fibers are carbon fibers.

16. The method of claim 15 wherein said reinforcing fibers are impregnated with said poly(biphenylene sulfide) resin in an amount in the range of from about 20% to about 80% by weight of the resulting fibers-resin mixture.

17. The method of claim 16 wherein said resin impregnated reinforcing fibers of step (a) are heated in step (b) to a temperature in the range of from about 840° F. to about 905° F.

18. The method of claim 17 which is further characterized to include the steps, subsequent to step (c), of heating and pressing at least two of said composites together to form a multi-ply laminated composite.

* * * * *